United States Patent Office 3,692,532
Patented Sept. 19, 1972

3,692,532
MILK-FRUIT JUICE BEVERAGE AND PROCESS
FOR PREPARING SAME
David R. Shenkenberg, 1111 Cameron Road, Alexandria, Va. 22308; Jiann C. Chang, 2414 Kensington St., Arlington, Va. 22207; and Locke F. Edmondson, 7110 Kempton Road, Lanham, Md. 20801
No Drawing. Filed Oct. 27, 1970, Ser. No. 84,532
Int. Cl. A23l 1/04
U.S. Cl. 99—28
9 Claims

ABSTRACT OF THE DISCLOSURE

Dry mixture of sweetener and sodium carboxymethylcellulose is mixed with a milk ingredient containing casein at a temperature below 90° F. The mixture is allowed to stand for at least 10 minutes causing the sodium carboxymethylcellulose to complex with the casein. Fruit juice is added to the complexed mixture after which the beverage is aged, pasteurized, and homogenized. Alternatively, the complexed mixture is pasteurized, homogenized, cooled, and then combined with fruit juice that has been pasteurized and cooled to form the beverage. The resulting beverage is a homogeneous, free-flowing, non-congealed liquid having a viscosity of less than 30 centipoises at 45° F. and stable at a pH below 5.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel, milk-fruit juice beverage, and to a process for making same. More specifically, it relates to a milk-orange juice product of low viscosity that is stable through a wide range of temperatures and pH values.

The nutritional values of the main ingredients of this invention, which are not lost in the combination, are well-known and need not be elucidated. In addition, the nutritional character of the product of this invention, that is, the highly desirable protein and mineral constituents of milk in combination with the vitamins and other nutrients of fruit juices makes it a highly desirable dietary supplement.

Milk and citrus juice combinations have been previously proposed but the products described were unstable and required special conditions to prevent separation of components, or they contained ingredients such as fruit peels and peel juices that are not generally considered an asset of palatability or consumer appeal. For example, U.S. Pat. No. 2,853,386 describes a product which needs prompt refrigeration after addition of the fruit juice so that the product will gel and prevent separation of ingredients. In order to dispense the product the gel has to be liquified in a cocktail shaker or mixer. U.S. Pat. No. 2,818,342 describes a product embodying orange juice and total peel ingredients including substantial portions of orange peel oil and pectin. The relatively large portion of concentrated peel oil and pectin present renders a concentrate bitter and unpalatable. The milk-orange juice product made from such a concentrate is apparently rendered palatable by the addition of 25–30% sugar.

Consequently, it is not difficult to understand why there is no product of the nature of the present invention currently being manufactured or sold commercially.

Therefore, it is an object of this invention to produce a refreshing, nutritious, milk-fruit juice beverage.

Another object of this invention is to produce a milk-fruit juice beverage that is stable through a wide range of pH and temperature levels.

A further object of this invention is to produce a nutritious, palatable, stable, low viscosity milk-fruit juice beverage According to this invention the above objects are accomplished by a process in which a sugar-stabilizer mixture is added to milk at a temperature below 90° F., and the mixture is allowed to stand for at least ten minutes, after which orange juice is added to the milk mixture, and the resulting milk-orange juice mixture is aged, pasteurized and homogenized.

The milk and orange juice are present in the product of this invention in a ratio of about 2 parts of milk to one pare of juice. Sweeteners and flavoring substances can be added as desired. A typical product formulation is as follows:

| Ingredients: | Percent by weight |
|---|---|
| Milk | 60.0 |
| Orange juice | 35.0 |
| Sugar | 4.8 |
| Stabilizer (CMC [1]) | 0.2 |

[1] Sodium carboxylcellulose.

The process for making the product as shown above is relatively simple and conventional milk processing equipment can be used.

The preferred methods of making the product of this invention are set forth below:

METHOD I (1) Dry mix sugar and stabilizer.
(2) Add sugar-stabilizer mixture to milk at not above 90° F.
(3) Allow milk, sugar-stabilizer mixture to stand for not less than 10 minutes after mixing at not above 90° F.
(4) Add orange juice to milk mixture, allow to age not less than 10 minutes at not above 90° F.
(5) Pasteurize and homogenize at normalk milk condition e.g., 3000+500 p.s.i. two stage or 1000 p.s.i. single stage.
(6) Cool and package for distribution and consumption as a fresh dairy product.

METHOD II (1) Dry mix sugar and stabilizer.
(2) Add sugar-stabilizer mixture to milk at not over 90° F.
(3) Allow milk, sugar-stabilizer mixture to stand for not less than 10 minutes at not above 90° F.
(4) Pasteurize and homogenize at normal milk conditions e.g., 1500+500 p.s.i. two stage or 1000 p.s.i. single stage.
(5) Cool to 40° F.
(6) Pasteurize and cool orange juice and add to the milk mixture.
(7) Package for distribution and consumption as fresh dairy product.

Both processes described above result in the formation of products which are most appealing and refreshing, yet are devoid of defects resulting from protein instability. The stability of the product is the result of a complex formed by the casein of the milk and the carboxyl groups of the CMC which prevents casein precipitation below pH 5.0. In order to stabilize effectively, the stabilizer should have acidic groups. Such common stabilizers as gelatin and vegetable gums fail to stabilize below pH 5.0; in fact, many exhibit a tendency to promote casein destabilization.

The quantity of ingredients is not critical except for the amount of stabilizer. In order to obtain maximum palatability, low levels of stabilizer must be used. Stabilizers such as gelatin and vegetable gums can stabilize at pH 5.0 and above but this is not the most desired product. High levels of gelatin or vegetable gums prevent precipitation and separation but the resulting heavy-bodied product lacks consumer appeal.

CMC is added at a ratio of approximately 1 part CMC to 250–2500 parts of milk depending on the protein content of the milk ingredient, type of CMC being used and desired viscosity. The particular ratio used is that which provides optimum consumer preference and maximum storage stability.

An important feature of this invention not found in the prior art is that sufficient time be allowed for the carboxyl groups of the CMC to react with the casein molecules. When sufficient time is not allowed, the product has an undesirable high viscosity and is not heat stable. In addition, incipient coagulation, casein precipitation and separation of ingredients occurs.

The process and product of this invention, that is, a free-flowing, non-congealed, mild-fruit juice beverage having a viscosity of less than 30 cp. at 45° F. and being stable at pH values below 5.0 has not been previously disclosed.

A wide variety of substances can be used to supply the milk, orange juice and sweetener ingredients of the product of the present invention. Representative thereof are the following: whole milk, skim milk, milk products with intermediate fat content levels and reconstituted milk concentrates; fresh orange juice, frozen orange juice, pasteurized orange juice, canned orange juice, orange juice containing preservative(s), reconstituted orange juice, and any beverage quality orange juice product; and any suitable natural or artificial sweetener. The stability of the product is not affected by the level of sweeteners so that level can be varied for individual tastes and preferences.

A stabilizer containing carboxyl groups which will react with the protein molecule is a requisite of this invention. The carboxymethylcellulose compounds meet this requirement and stabilize the protein without raising the viscosity of the product to undesirably high levels.

The process and especially the amounts of the ingredients of this invention can be varied as desired to obtain products with a wide variety of physical properties. However, regardless of the variations in physical properties, the products of the invention are unique in that even though their viscosities at pH levels below 5.0 are low, protein precipitation and coagulation do not occur.

In addition to the products described above, that is, low viscosity products stable at pH levels below 5.0, products stable at levels above 5.0 and stable products having high viscosities can also be prepared by the process of this invention.

We claim:

1. A stable milk-fruit juice beverage consisting essentially of a milk ingredient containing casein and a fruit juice ingredient, and minor amounts of sweetener and sodium carboxymethylcellulose, said sodium carboxymethylcellulose having been completed with the said casein, the complex being stable at an acid pH, said beverage being a homogeneous, free-flowing, non-congealed liquid having a viscosity of less than 30 centipoises at 45° F. and being stable at pH levels below 5.0.

2. The milk-fruit juice beverage of claim 1 in which the milk and fruit juice ingredients comprise at least 95% of the total weight of the beverage.

3. The milk-fruit juice beverage of claim 2 in which the fruit juice is orange juice.

4. The milk-fruit juice beverage of claim 3 in which the sweetener is sucrose.

5. The milk-fruit juice beverage of claim 4 in which the amount of sodium carboxymethylcellulose is about 0.2% by weight.

6. The milk-orange juice beverage of claim 3 consisting of the following ingredients on a weight basis: whole milk, 60%; orange juice, 35%; sugar, 4.8%; sodium carboxymethylcellulose, 0.2%.

7. A process of preparing a stable, free-flowing, non-congealing, low-viscosity milk-fruit juice beverage, comprising the steps of:
  (a) dry mixing a sugar and sodium carboxymethylcellulose;
  (b) adding the sugar-sodium carboxymethylcellulose mixture to a milk ingredient containing casein at a temperature below 90° F., and mixing;
  (c) complexing the sodium carboxymethylcellulose and the milk casein by allowing the milk-sugar-sodium carboxymethylcellulose mixture to stand for at least 10 minutes;
  (d) adding fruit juice to the complexed mixture;
  (e) ageing for at least 10 minutes at a temperature below 90° F.; and
  (f) pasteurizing and homogenizing the milk-sugar-sodium carboxymethylcellulose fruit juice mixture.

8. The process of claim 7 in which the fruit juice is fresh orange juice, the milk is whole milk, the sugar is sucrose.

9. A process for preparing a stable, free-flowing, non-congealing, low-viscosity, milk-fruit juice beverage, comprising the steps of:
  (a) dry mixing a sugar and sodium carboxymethylcellulose;
  (b) adding the sugar-sodium carboxymethylcellulose mixture to a milk ingredient containing casein at a temperature below 90° F., and mixing;
  (c) complexing the sodium carboxymethylcellulose and the milk casein by allowing the milk-sugar sodium carboxymethylcellulose mixture to stand unagitated for at least 10 minutes;
  (d) pasturizing and homogenizing the milk-sugar-sodium carboxymethylcellulose mixture;
  (e) cooling to about 40° F.;
  (f) pasteurizing and cooling orange juice; and
  (g) adding the pasteurized and cooled orange juice to the pasteurized and homogenized milk-sugar-sodium carboxymethylcellulose mixture.

References Cited
UNITED STATES PATENTS

| | | | |
|---|---|---|---|
| 2,853,386 | 9/1958 | Hughes | 99—54 |
| 3,174,865 | 3/1965 | Johnston et al. | 99—78 |
| 3,118,769 | 1/1964 | Pletcher | 99—54 |
| 2,924,531 | 2/1960 | Stewart et al. | 99—54 |
| 1,925,441 | 9/1933 | Finley et al. | 99—78 |
| 2,818,342 | 12/1957 | Ransom | 99—54 |
| 2,834,679 | 5/1958 | Stoloff | 99—54 |

OTHER REFERENCES

Condensed Chemical Dictionary, 7th Edition, 1966, pp. 858–859.

MORRIS O. WOLK, Primary Examiner

S. B. DAVIS, Assistant Examiner

U.S. Cl. X.R.
99—20, 54, 105